United States Patent Office 3,110,616
Patented Nov. 12, 1963

3,110,616
PROCESS FOR COLORING ANODIZED ALUMINUM
Robert A. Brooks, Salem, N.J., and Rolf Dessauer, Wilmington, Del., assignors to E. I. du Pont de Nemours and Company, a corporation of Delaware
No Drawing. Filed Apr. 5, 1961, Ser. No. 100,787
3 Claims. (Cl. 117—127)

This invention relates to a process for coloring oxide-coated aluminum, such as anodized aluminum, in a complete shade range by employing organic solvents and organic base-solubilized pigments as the color producing materials. Starting with pigments which are highly insoluble in water or organic solvents, it is now possible to introduce fast colors into the oxide coating by applying organic base-solubilized derivatives of these pigments and regenerating the pigments inside the porous oxide layer. These solubilized pigments belong to many classes, but all have in common the presence of at least one hydrogen atom attached to nitrogen which can be removed temporarily by the action of a strong base, e.g., benzyl trimethylammonium hydroxide, in a non-acidic polar organic solvent, e.g., dimethylformamide. This includes as colorants, among others, metal free phthalocyanines, quinacridones, etc.

It is preferred that the pigments be sealed in the pores of the coating, as more fully described below, in order to provide colorations which exhibit outstanding resistance to abrasion, weathering and the like. The colored oxide coatings provided by the processes of this invention possess excellent light fastness, in many instances exceeding an exposure of 2000 Fade-Ometer hours without appreciable change.

It is an object of this invention to employ pigments, which are highly insoluble in water or organic solvents, in novel processes for rapidly coloring oxide-coated aluminum in level shades of various colors, such as blue, red, yellow, and intermediate hues. It is a further object to color oxide-coated aluminum in either light or heavy shades. It is also an object of this invention to provide colored aluminum which exhibits outstanding light fastness, often exceeding 2000 hours' exposure in the Fade-Ometer.

These and other objects of this invention are accomplished by a process for coloring anodized aluminum which comprises the steps of, (a) applying to the surface of anodized aluminum an organic solvent solution of an organic base derivative of an insoluble colorant which colorant contains at least one weakly acidic hydrogen atom attached to nitrogen and (b) subjecting the treated aluminum surface to the action of hot water or steam, whereby the solubilized colorant is converted to pigment which is sealed within the pores of the anodized aluminum. The essence of the present invention resides in the use of a pigment or colorant which is highly insoluble in water or organic solvents for coloring anodized aluminum. These colorants have at least one hydrogen atom attached to nitrogen, which is weakly acidic, and which can be removed by the action of a strong base. This may be accomplished by treating the colorant with a strong organic base in a specific type of organic solvent. The resulting organic solvent solution is then used to treat anodized aluminum. The solubilized colorant is then converted to the pigment by subjecting the treated aluminum to hot water or steam and the pores of the aluminum are also sealed. If desired, the solubilized colorant may be converted to the pigment by subjecting the treated aluminum to cold water or a hydrogen-donating compound, such as an acid, followed by the sealing step with hot water or steam. It is quite unexpected that the present process provides colored anodized aluminum in a wide range of shades which exhibit outstanding light fastness.

Representative insoluble colorants or organic pigments which may be used in this invention are illustrated by the following structures. The fundamental dye structures may be substituted as shown wherein R represents simple substituents, such as phenyl, chlorine, bromine and the like, which are inert to the strong alkaline conditions employed. It will be noted that all of these colorants contain at least one weakly acidic hydrogen atom bound to nitrogen.

(a) 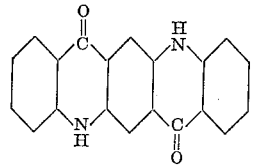

(b) 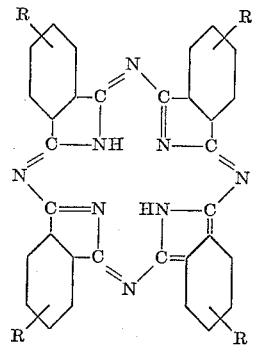

(c) 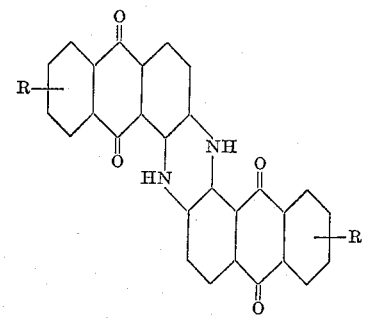

(d) 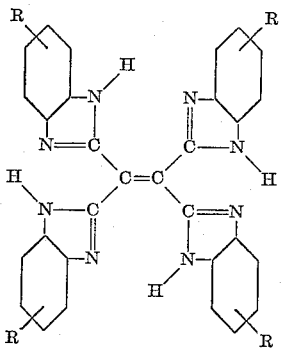

(e) 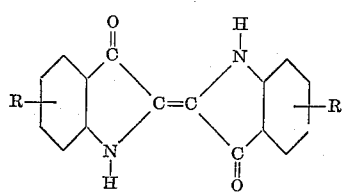

As noted above, the organic solvent solution of the highly insoluble pigment which contains at least one weakly acidic hydrogen atom bound to a cyclic nitrogen is formed by treating the pigment with a relatively strong organic base. The solvent employed should be a stable, donor, non-acidic, polar organic solvent which contains an atom selected from the group consisting of oxygen, nitrogen and sulfur. Representative polar solvents include dimethylformamide, diethylformamide, diethylacetamide and dimethylsulfoxide. If desired, these solvents may be used in admixture with other organic compounds such as benzene, acetone, pyridine, quinoline, 2-picoline, 2,6-lutidine, pyrrole, tetramethylene sulfone, ethanol, isopropanol, n-butanol, n-amyl alcohol, isoamyl alcohol, sec-isoamyl alcohol, n-octyl alcohol, n-dodecyl alcohol, ethylene-glycol monomethyl ether, the corresponding monoethyl and monobutyl ethers, and cyclohexanol. When using mixtures of the polar organic solvent with the above mentioned compounds, the relative amount of the two materials in the mixture is not critical so long as there is sufficient polar organic solvent present to provide about one part by weight thereof per one part by weight of solubilized colorant. In preparing the organic solvent solution, the temperature is not critical. Temperatures ranging from about 20° C. to about 100° C. are convenient and satisfactory. The concentration of the colorant in the solution is not critical; however, for practical purposes the solution should contain about 2 to 5 percent by weight of colorant.

The strong organic base which is used to form the base-solubilized derivative of the colorant or pigment is a quaternary ammonium hydroxide. These hydroxides may be represented by the general formula

R—N(Alk)₃OH wherein Alk designates a lower alkyl radical while R designates a lower alkyl, benzyl or hydroxyethyl radical. Practical illustrations of this group of bases are tetramethylammonium hydroxide, benzyltrimethylammonium hydroxide and 2-hydroxyethyltrimethylammonium hydroxide. The amount of strong base employed should be sufficient to provide at least one molar equivalent for each weakly acidic hydrogen atom on the colorant or pigment.

The anodized aluminum may be treated with the organic solvent solution of the base-solubilized colorant by immersing the aluminum in the solution at temperatures of about 20 to 75° C. for a period of time of a few seconds to 10 minutes. In lieu of immersing the anodized aluminum in the solution it is possible to treat the anodized aluminum by well-known spraying or painting techniques. The anodized aluminum is then removed from the solution and the base-solubilized colorant then converted to pigment by one of several procedures. In the first of these, the treated aluminum is subjected to the action of boiling water or steam. This procedure converts the base-solubilized colorant to pigment and seals the pores of the anodized aluminum. In another procedure, the anodized aluminum is subjected to the action of cold water (temperatures of about 25° C. or lower) or a hydrogen donating compound, such as acetic acid, dilute hydrochloric acid or aqueous mineral acid. This converts the base-solubilized colorant to pigment and the pores of the anodized aluminum are then sealed by the use of boiling water or steam.

The following examples will better illustrate the nature of the present invention; however, the invention is not intended to be limited to these examples. Parts are by weight unless otherwise indicated.

*Example 1*

A piece of anodized aluminum (3″ x 1″ strip) having an 0.8 mil oxide coating is immersed in 50 ml. of a saturated solution of dimethylformamide, containing about 5% by weight of solvent, of benzyltrimethylammonium hydroxide and 5% by weight (same basis) of metal-free phthalocyanine. After immersion at room temperature (25° C.) for 5 minutes, the metal sample is removed from the solution, and placed in a boiling water bath for 30 minutes to seal the anodic coating. The blue color which develops during this latter step is light-stable, showing no color change in the Fade-Ometer for at least 2,000 hours.

When the above experiment is repeated, except that the anodized aluminum article is immersed in a hot (60–100° C.) solvent solution of the base derivative of phthalocyanine for five minutes, a somewhat deeper shade is obtained. It is similarly lightfast.

Essentially similar results are obtained when the colorant is a chlorinated metal-free phthalocyanine, containing at least 12 chlorine atoms on the periphery of the aromatic system. The resulting shade is green, and is lightfast in the Fade-Ometer for at least 2,000 hours.

When polished, thinly anodized sheets of aluminum (0.2 mil oxide coating) are employed in this example instead of the metal having an 0.8 mil coating, colorations are obtained which are somewhat less intense, but similarly lightfast.

By employing more dilute solutions of the pigment in this example and by immersing the anodized aluminum for a shorter period of time of about 1 minute, lighter shades are obtained.

*Example 2*

The procedure of Example 1 is repeated. After the anodized aluminum has been removed from the dye bath, it is rinsed with cold water (20° C.). This regenerates the insoluble pigment. The oxide coating is then sealed in boiling water. The coloration is lightfast for at least 2,000 Fade-Ometer hours.

*Example 3*

When the procedure of Example 1 is repeated except that the metal-free phthalocyanine used therein is replaced by quinacridone, the anodized aluminum is colored a bluish-red shade which has excellent lightfastness.

In the place of quinacridone, derivatives thereof may be employed such as the dichloro-, dimethyl- and dimethoxy-derivatives disclosed in U.S. 2,821,529 to obtain lightfast shades ranging from blue-red to yellow-red.

The polymorphic modifications of quinacridone, described in the U.S. Patents 2,844,484, 2,844,485 and 2,844,581, and the tetrachloroquinacridones of U.S. 2,821,530, may be used in this example to give similar results.

The oxide-coated aluminum pieces colored by the quinacridones as described in this example showed no diminution in color after a light exposure of 3500 Fade-Ometer hours.

*Example 4*

When the metal-free phthalocyanine in the procedure of Example 1 is replaced by other pigments, as listed in the following table, colorations are obtained which possess excellent lightfastness.

| Pigment: | Hue Obtained |
|---|---|
| Indanthrone | Blue. |
| 3,3′-bianthrapyrazoledione | Yellow. |
| Indigo | Blue. |
| 1,1,2,2-tetra(2-benzimidazolyl)ethylene | Yellow. |

By employing the process of the present invention wherein organic solvent solutions of base-solubilized colorants or pigments are used, it is possible to color anodized aluminum rapidly and effectively in essentially all hues of the visible spectrum in either light or heavy shades. The colored aluminum exhibits outstanding lightfastness often exceeding 2,000 hours' exposure in the Fade-Ometer.

As many widely different embodiments of this invention may be made without departing from the spirit and scope thereof, it is to be understood that this invention is not limited to the specific embodiments thereof except as defined in the appended claims.

What is claimed is:

1. A process for coloring anodized aluminum wherein (1) an organic solvent solution of an organic base derivative of an organic pigment containing at least one weakly acidic hydrogen atom attached to cyclic nitrogen is applied to an anodized aluminum surface followed by (2) subjecting the treated aluminum surface to water; said organic solvent being a stable, donor and non-acidic polar organic solvent which contains an atom selected from the group consisting of oxygen, nitrogen and sulfur; said organic base derivative being a reaction product of (A) a quaternary ammonium hydroxide selected from the group consisting of tetramethylammonium hydroxide, benzyltrimethylammonium hydroxide and 2-hydroxyethyltrimethylammonium hydroxide and (B) an organic pigment selected from the group consisting of a quinacridone compound, a metal-free phthalocyanine compound, an indanthrone compound, a tetrabenzimidazolylethylene compound and an indigo compound.

2. A process according to claim 1 wherein the treated aluminum is subjected to the action of cold water followed by treatment with hot water.

3. A process according to claim 1 wherein the treated aluminum surface is subjected to the action of a hydrogen-donating compound followed by treatment with hot water.

References Cited in the file of this patent

UNITED STATES PATENTS

| | | |
|---|---|---|
| 2,237,483 | Graenacher et al. | Apr. 8, 1941 |
| 2,614,912 | Rice | Oct. 21, 1952 |
| 2,844,484 | Reidinger et al. | July 22, 1958 |